INVENTORS
A.B. BROERMAN
M.E. REINECKE
BY Hudson & Young
ATTORNEYS

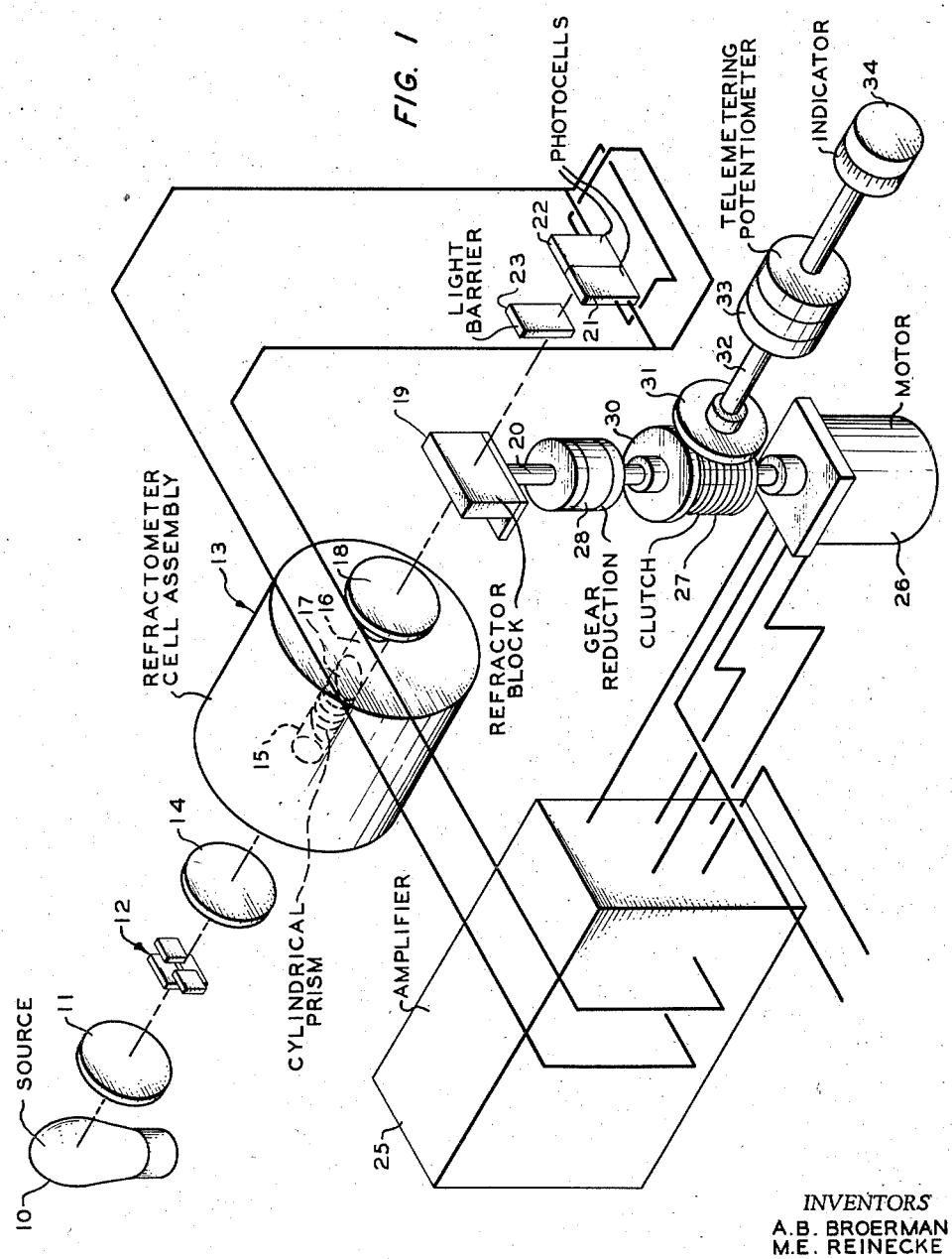

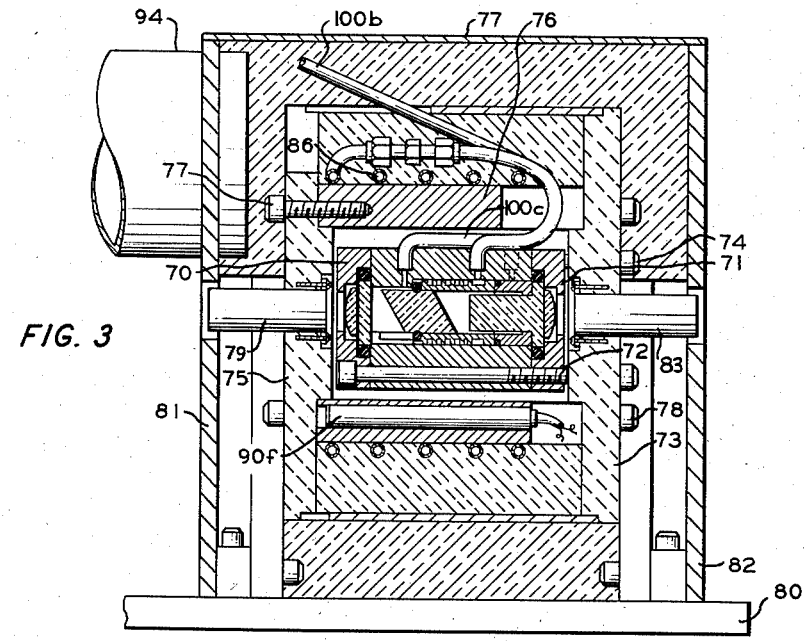
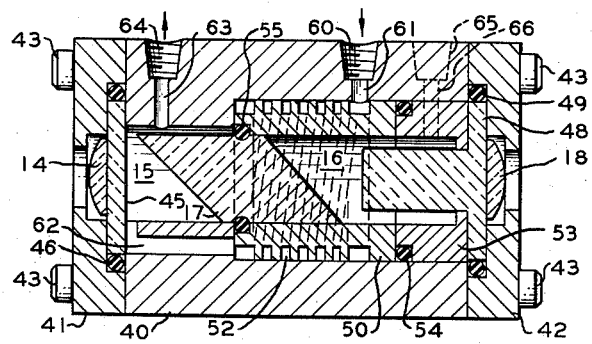
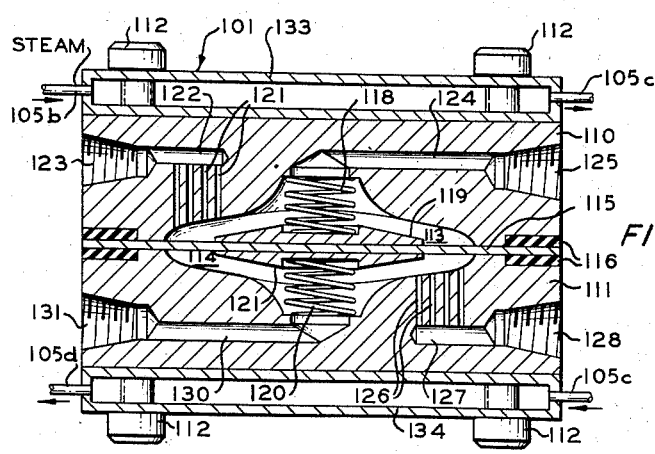

United States Patent Office 2,886,715
Patented May 12, 1959

2,886,715

DIFFERENTIAL REFRACTOMETER FOR ELEVATED TEMPERATURES

Arthur B. Broerman and Marvin E. Reinecke, Bartlesville, Okla., assignors to Phillips Petroleum Company, a corporation of Delaware Application March 25, 1957, Serial No. 648,251

9 Claims. (Cl. 250—218)

This invention relates to the measurement of the refractive indices of fluid streams.

In various chemical and petroleum operations, it is common practice to analyze a sample stream removed from some point in the process and to adjust an operating variable in response to the analysis to maintain desired conditions. One particular system of analysis that is useful involves a measurement of the refractive index of the sample stream. This measurement can advantageously be made by comparing the refractive index of the sample stream with the refractive index of a reference fluid. This is accomplished by directing a beam of radiation through a refractomer cell assembly and measuring the deviation of the emerging beam. The refractomer cell is provided with at least two adjacent compartments which are separated by a diagonal transparent plate. A reference fluid is positioned in one chamber and the sample stream is circulated continuously through the second chamber. An instrument of this type is generally referred to as a differential refractometer.

In order to make accurate measurements with differential refractometers, it is important that the two fluids being compared be maintained at exactly the same temperatures and pressures. This is particularly true in measuring the refractive indices of liquids because such refractive indices vary considerably with changes in temperature and pressure. In one particular measurement, for example, it has been discovered that a difference of 0.05° F. between two identical fluids appears as a refractive index difference of 0.00001. In accordance with the present invention, a refractometer is provided which is capable of maintaining the temperature difference between the sample fluid and a reference fluid within approximately this order of magnitude. The refractometer of this invention is also particularly adapted to be used in measuring the refractive indices of sample streams at elevated temperatures. Such streams may include, for example, molten sulfur, ammonium nitrate solutions, ammonium sulfate solutions, and polyolefins dissolved in hydrocarbon solvents. It is important that streams of this type be maintained at temperatures substantially above normal atmospheric temperature because the streams tend to solidify at atmospheric temperature. The refractometer of this invention incorporates means to maintain a sample stream at an elevated temperature and at a temperature which is substantially equal to the temperature of a reference fluid.

Accordingly, it is an object of this invention to provide an improved differential refractometer.

Another object is to provide an improved refractometer wherein two fluids being compared are maintained at common temperatures and pressures.

A further object is to provide a differential refractometer which is particularly adapted to analyze sample materials that are maintained at elevated temperatures.

Other objects, advantages and features of the invention should become apparent from the following detailed description which is taken in conjunction with the accompanying drawing in which:

Figure 1 is a schematic view of a differential refractometer which incorporates features of this invention.

Figure 2 is a sectional elevational view of the refractometer cell assembly of Figure 1.

Figure 3 is a view, shown partially in section, of the refractometer cell assembly and surrounding heat insulating material.

Figure 6 is a sectional view of the pressure equalizer which is included in the flow system.

Figure 4:
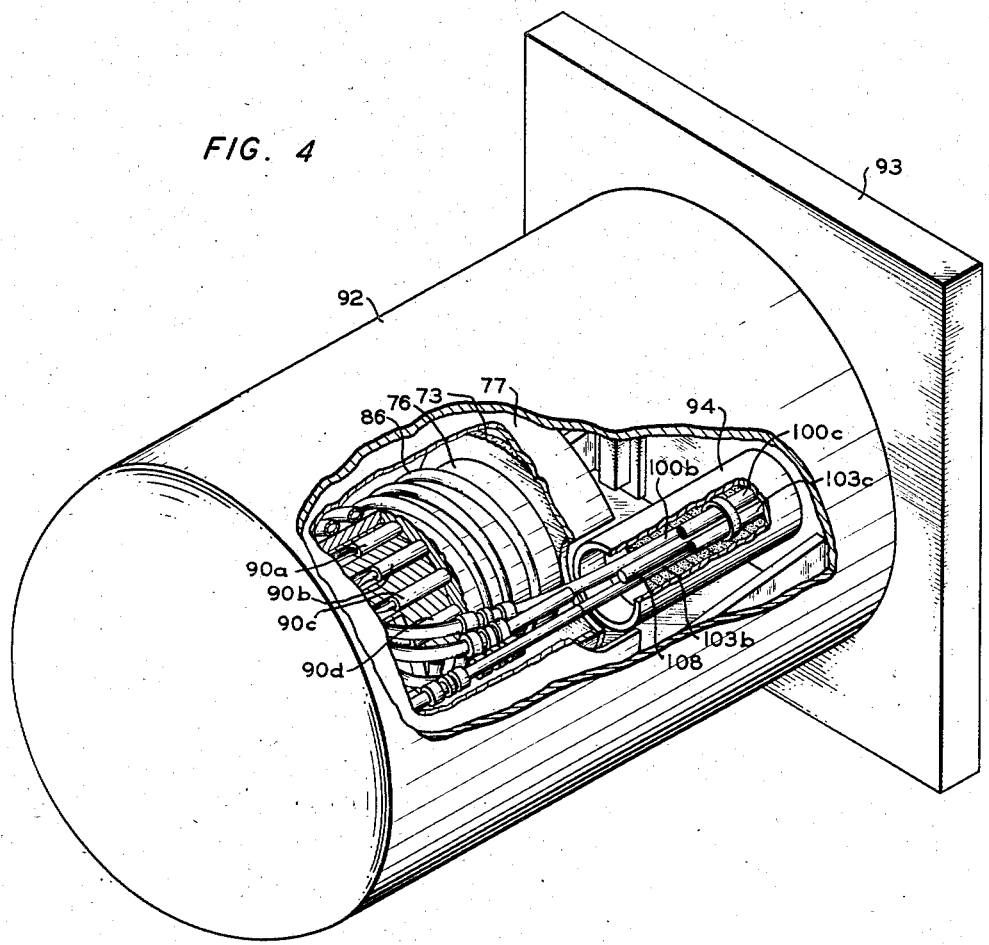
Figure 4 is a perspective view showing the analyzer of Figure 1 enclosed in an explosion proof housing.

Referring now to the drawing in detail and to Figure 1 in particular, there is shown a lamp 10 which directs radiation through a condensing lens 11. The radiation transmitted through lens 11 is directed through a slit assembly 12 into a refractometer cell assembly 13. Cell assembly 13 is provided with an inlet lens 14 which collimates radiation transmitted through slit 12. Cell assembly 13 includes two fluid chambers 15 and 16 which are separated by a cylindrical prism 17. A converging lens 18 is positioned across the second end of cell assembly 13 and serves to focus the transmitted radiation at a detector which comprises adjacent photocells 21 and 22. The beam of radiation emerging from cell assembly 13 passes through a refractor block 19 which is mounted on a shaft 20 so as to be free to rotate in the radiation beam. A light opaque barrier 23 is centered between photocells 21 and 22 to reduce the amount of radiation incident upon the two photocells.

Photocells 21 and 22 are connected in electrical opposition to one another to the input of an amplifier circuit 25. Amplifier circuit 25 preferably is of the type which converts an input direct voltage into a corresponding alternating signal which is then amplified. The amplified signal is compared with a reference voltage to drive a two phase induction motor 26 in a direction which is representative of the phase of the input signal applied to amplifier 25 from photocells 21 and 22. The drive shaft of motor 26 is connected through a friction clutch 27 and reduction gears 28 to the shaft 20 which rotates block 19. The drive shaft of motor 26 is also connected through clutch 27 and bevel gears 30 and 31 to a shaft 32 which carries a telemetering potentiometer 33 and an indicator 34.

The refractometer cell assembly is illustrated in detail in Figure 2. A cylindrical housing 40 is provided with end caps 41 and 42 which are retained in position by screws 43. A glass end plate 45 and lens 14 are positioned across the first end of housing 40 and retained in position by cap 41. An O-ring 46 prevents fluid leakage from the interior of housing 40 past plate 45. The second end of housing 40 is closed by a flanged transparent plug 48 which has lens 18 attached thereto. Plug 48 extends into the interior of housing 40 and is retained in place by cap 42. A second O-ring 49 prevents fluid leakage from the interior of housing 40 past plug 48. A metal sleeve 50, having a spiral recess 52 in the periphery thereof, occupies the center portion of housing 40. Sleeve 50 is retained in position by a second sleeve 53 which is held in place by plug 48. An O-ring 54 between sleeves 50 and 53 prevents fluid leakage. Cylindrical prism 17 thus divides the interior of housing 40 into chambers 15 and 16. An O-ring 55 is fitted into a recess in prism 17 to prevent leakage between chambers 15 and 16.

A sample fluid inlet opening 60 in housing 40 is connected by a passage 61 to the first end of recess 52. The second end of recess 52 is connected by a passage 62 in housing 40 to chamber 15. A passage 63 extends between the opposite side of chamber 15 and an outlet opening 64. The sample fluid to be measured thus passes through spiral recess 52 prior to its entry into chamber 15. This results in efficient heat exchange between the sample fluid and the reference fluid in chamber 16 through metal sleeve 50. A reference fluid inlet 65 is connected by a passage 66 to chamber 16. A corresponding outlet, not shown in Figure 2, is provided to remove the reference fluid.

Plug 48 serves two important functions. It reduces the volume of reference fluid chamber 16 so as to provide more efficient heat exchange between the fluids and the two chambers. Plug 48 also shortens the radiation path through fluid chamber 16 so that more opaque reference fluids can be employed, if necessary. The illustrated cell construction readily permits withdrawal of cylindrical prism 17 for cleaning or replacement. The angle which the ends of this prism make with the optical axis of the cell assembly can be so selected as to give different sensitivities. In general, it is desired that the angle be a maximum to provide the greatest refraction of the transmitted light beam.

Figure 7:
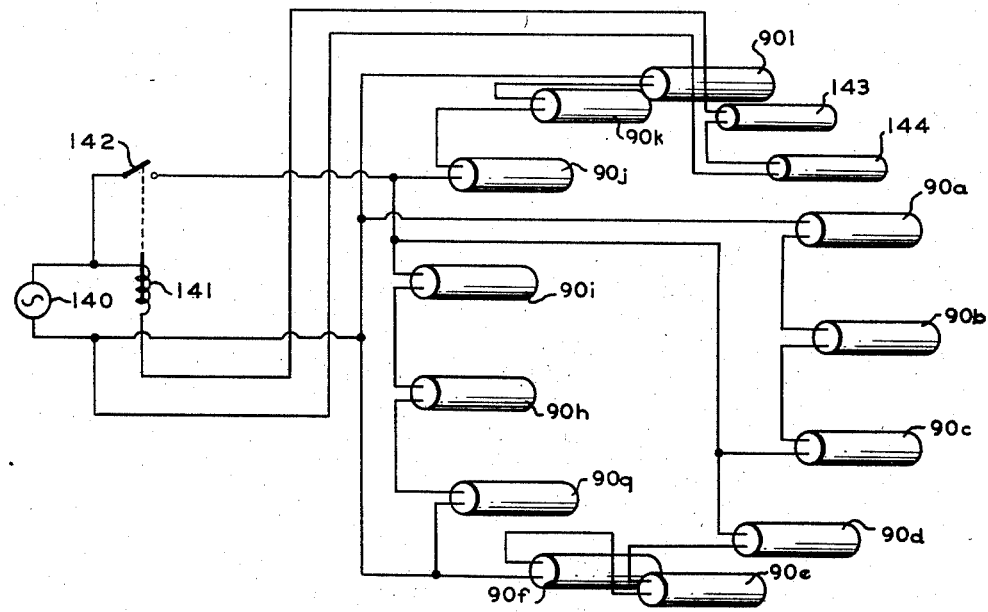
Figure 7 is a circuit drawing of the heating elements employed in the refractometer.

As previously mentioned, it is sometimes desirable to employ a differential refractometer for analyzing sample fluids which must be maintained at elevated temperatures. In such an application, the reference fluid must also be maintained at this elevated temperature. This requires efficient heat exchange and insulation to maintain the desired elevated temperature. This is provided in accordance with the present invention by means of the assembly illustrated in Figure 3. Cell assembly 13 is mounted between two metal end plates 70 and 71 which are attached to one another by screws 72 and to a cylindrical plate 73 by screws 74. Plate 73 is constructed of a refractory material, such as aluminum oxide. A second refractory plate 75 is positioned across the second end of the cell assembly. Plate 75 is attached to a metal sleeve 76 which encloses the cell assembly. Screws 77 retain plate 75 in engagement with sleeve 76, and screws 78 retain plate 73 in engagement with sleeve 76. Metal sleeve 76 thus serves as a heat reservoir and radiates heat into the cell assembly. The entire assembly is mounted on a base plate 80. Cylindrical end plates 81 and 82 enclose the entire assembly and define an open space which is filled with an insulating material, such as glass wool. Light tubes 79 and 83 are mounted at the ends of the cell assembly. These tubes reduce heat transfer by convection currents in the regions near the ends of the cell assembly. A plurality of electrical heating elements 90a to 90l, see Figure 7, are fitted into spaced holes which are drilled in sleeve 76. These heating elements are connected in circuit with a source of current 140 and a pair of thermostats 143 and 144.

This heating circuit is described in greater detail hereinafter. In many applications of differential refractometers as process analysis instruments, it is necessary to enclose the apparatus in an explosion proof housing. This is illustrated in Figure 4 wherein the cell assembly is shown within a cylindrical bell 92 which is attached to an end plate 93. The conduits which circulate the sample fluid and the reference fluid enter bell 92 through plate 93 and pass through a cylindrical member 94 which is filled with heat insulating material.

Figure 5:
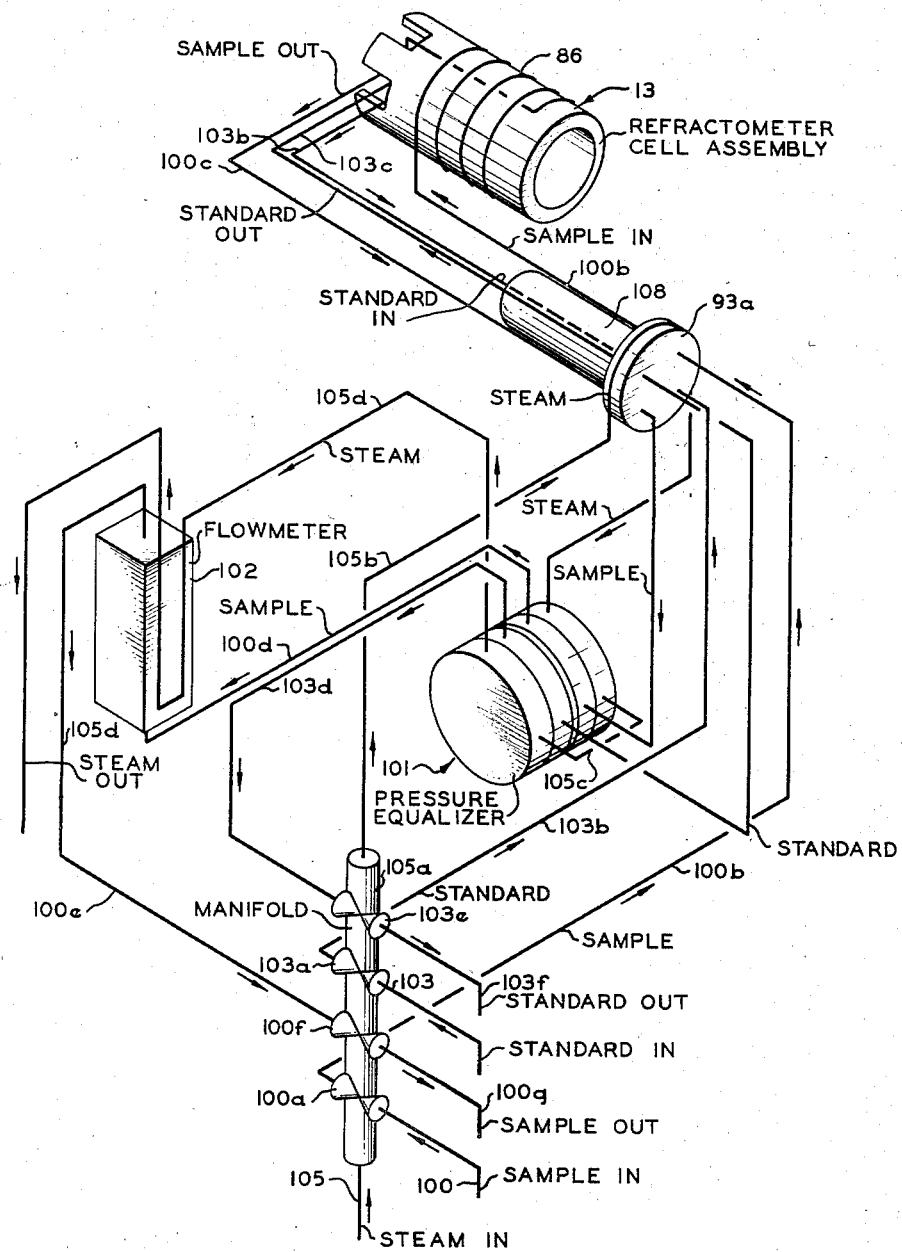
Figure 5 is a schematic view of the fluid sample and reference fluid circulation system.

The fluid flow system is illustrated schematically in Figure 5. The sample fluid to be analyzed is introduced through a conduit 100 which communicates with the inlet of a valve 100a. The outlet of valve 100a is connected by a conduit 100b through a plug 93a in plate 93 to the inlet of a coil 86 which surrounds sleeve 76 and is in thermal contact therewith, see Figure 3. The sample fluid then circulates through chamber 15 and is removed from the cell assembly through a conduit 100c which passes through plug 93a and communicates with a pressure equalizer 101, the latter being described in detail hereinafter. The sample fluid is removed from pressure equalizer 101 through a conduit 100d which communicates with the inlet of a flow meter 102. The outlet of flow meter 102 is connected by a conduit 100e to the inlet of a valve 100f. The outlet of valve 100f is connected to a sample outlet 100g. A reference fluid is introduced into the system through a conduit 103 which communicates with the inlet of a valve 103a. The outlet of valve 103a is connected by a conduit 103b which extends through plug 93a to the inlet opening of chamber 16. The outlet opening of chamber 16 is connected by a conduit 103c which extends through plug 93a to a second inlet of pressure equalizer 101. The corresponding outlet of pressure equalizer 101 is connected by a conduit 103d to the inlet of a valve 103e. The outlet of valve 103e is connected to an outlet conduit 103f. In normal operations, valves 103a and 103e are closed so that the reference fluid is locked into chamber 16 of the cell assembly. However, a reference fluid can be circulated continuously through this chamber, if desired.

In order to prevent solidification or condensation of the fluids outside bell 92, steam is circulated in thermal contact with the various conduits and valves. The steam is introduced into the system through a conduit 105 which communicates with the inlet of a manifold 105a that is in thermal contact with valves 100a, 100f, 103a, and 103e. The steam is passed from manifold 106 through a conduit 105b which is in thermal contact with plug 93a. The second end of conduit 100b is in communication with pressure equalizer 101. Steam passes through pressure equalizer 101 in two directions and is removed through a conduit 105d which is in thermal contact with flowmeter 102. A rod 108 of heat conductive material, such as copper, is attached to plug 93a and extends into bell 92 in thermal contact with conduits 100b, 100c, 103b, and 103c. This rod further equalizes the temperatures of the two fluids being compared.

As previously mentioned, it is important that the pressures of the two fluids be equalized. This is accomplished to a large extent by incorporating a pressure regulator, not shown, in sample inlet conduit 100. Pressure equalizer 101 completes the pressure equalizing system. This pressure equalizer is illustrated in detail in Figure 6. First and second plates 110 and 111 are retained together by means of screws 112. Plates 110 and 111 are provided with recessed chambers 113 and 114, respectively, which are separated by a diaphragm 115. Sealing gaskets 116 are provided at the periphery of diaphragm 115. A first spring 118 extends between plate 110 and a backing plate 119 which is in engagement with diaphragm 115. A similar spring 120 and backing plate 121 are positioned in chamber 114. Passages 121 and 122 communicate between chamber 113 and a fluid opening 123 in plate 110. A passage 124 communicates between chamber 113 and a second fluid opening 125 in plate 110. Passages 126 and 127 communicate between chamber 114 and a first fluid opening 128 in plate 111. A passage 130 communicates between chamber 114 and a second fluid opening 131. Openings 123, 125, 128, and 131 are connected to respective conduits 100c, 100d, 103c, and 103d of Figure 5. The pressures of the sample and reference fluids are thus equalized by deflection of diaphragm 115 to change the relative volumes of the two chambers in the pressure equalizer. Springs 118 and 120 maintain the diaphragm at a center position in the absence of a pressure differential.

Hollow plates 133 and 134 are attached to respective plates 110 and 111 so that steam can be circulated through the pressure equalizer assembly. This further tends to equalize the temperatures of the two fluids and to maintain this common temperature at an elevated value to prevent solidification or condensation within the pressure equalizer. The conduits which supply this steam are illustrated in Figure 5.

The electrical circuit associated with heating elements 90a to 90l is illustrated in Figure 7. A current source 140 is connected in series relationship with a solenoid 141 and thermostats 143 and 144. Heating elements 90a, 90b, and 90c are connected in series relationship with one another; heating elements 90g, 90h, and 90i are connected in series relationship with one another; and heating elements 90j, 90k, and 90l are connected in series relationship with one another. The four groups of heating elements are connected to current source 140 through a switch 142 which is closed when solenoid 141 is energized.

Normally, the sample fluid has sufficient heat capacity to keep the cell at the required elevated temperature. In case of sample flow failure, the sample fluid within the cell might freeze or otherwise cause trouble. This is prevented in accordance with the present invention by the heating elements. Thermostat 143 provides on-off control to keep the temperature up to the set point. Thermostat 144 is a safety device which opens if the temperature exceeds a predetermined value. The heating elements also raise the temperature of the analyzer to an operating value initially.

Figure 8:
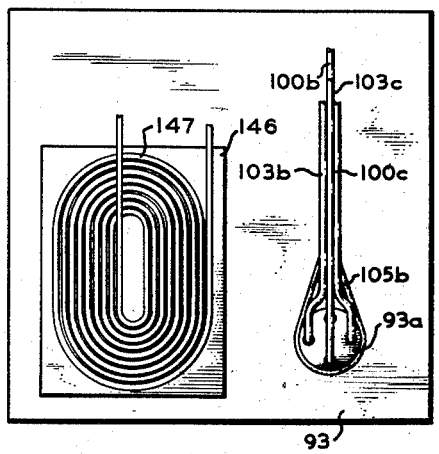
Figure 8 is a view of the front of the refractometer housing.

A cooling coil 147 is attached to a plate 146 of heat conductive material which in turn is attached to the front plate 93 of the analyzer housing, see Figure 8. Water or other coolant is circulated through coil 147 to keep the interior of the analyzer within safe temperature limits at all times.

From the foregoing description, it should be evident that there is provided in accordance with this invention an improved differential refractometer wherein efficient heat exchanging and pressure equalizing are accomplished. The refractometer is particularly adapted for use in equalizing fluid streams which must be maintained at elevated temperatures. Apparatus is provided to maintain a constant elevated temperature.

While the invention has been described in conjunction with a present preferred embodiment, it should be evident that it is not limited thereto.

What is claimed is:

1. A refractometer adapted to be operated at elevated temperatures comprising a source of radiation, a radiation detector, a refractometer cell positioned between said source and said detector to deflect a beam of radiation by an amount representative of a test fluid disposed in said cell, a block of heat conductive material surrounding said cell, a conduit in thermal contact with said block, means connecting one end of said conduit to said cell, the second end of said conduit being adapted to be connected to a source of fluid to be tested so that the test fluid can be passed through said conduit into said cell, a housing surrounding said block and spaced therefrom, and a mass of heat insulating material disposed in the region between said block and said housing.

2. A refractometer adapted to be operated at elevated temperatures comprising a source of radiation, a radiation detector, a refractometer cell positioned between said source and said detector to deflect a beam of radiation by an amount representative of a test fluid disposed in said cell, a block of heat conductive material surrounding said cell, a conduit in thermal contact with said blocks, means connecting one end of said conduit to said cell, the second end of said conduit being adapted to be connected to a source of fluid to be tested so that the test fluid can be passed through said conduit into said cell, an electrical heating element in thermal contact with said block, a thermostat in thermal contact with said block, a source of electrical energy, and means connecting said heating element and said thermostat in circuit with said source of electrical energy so that said thermostat regulates energy supplied to said heating element to tend to maintain said block at a predetermined temperature, a housing surrounding said block and spaced therefrom, and a mass of heat insulating material disposed in the region between said block and said housing.

3. A refractometer adapted to be operated at elevated temperatures comprising a source of radiation, a radiation detector, a refractometer cell positioned between said source and said detector to deflect a beam of radiation by an amount representative of a test fluid disposed in said cell, a block of heat conductive material surrounding said cell, a conduit in thermal contact with said block, means connecting one end of said conduit to said cell, a first housing surrounding said block and spaced therefrom, a mass of heat insulating material disposed in the region between said block and said first housing, a second housing surrounding said first housing, first conduit means extending from a region exterior of said second housing to the second end of said conduit to supply a test fluid, and second conduit means communicating between said cell and a region exterior of said second housing to vent the test fluid from said cell.

4. The refractometer of claim 3 further comprising heating means in thermal contact with said first conduit means to maintain the test fluid at an elevated temperature.

5. A refractometer adapted to be operated at elevated temperatures comprising a source of radiation; radiation detecting means; a refractometer cell disposed between said source and said detecting means, said cell comprising a first cylindrical metal block having a cylindrical light passage therethrough, radiation transparent means positioned across the ends of said passage, a radiation transparent plate disposed in said passage to divide same into first and second chambers, the planes of the faces of said plate making an angle other than 90° with the axis of said passage, and inlet and outlet passages in said first chamber; a second cylindrical metal block surrounding said first block; a first conduit enclosing said second block and in contact therewith; means connecting one end of said conduit to said inlet passage; circular plates disposed across the ends of said second block, said circular plates having openings therein in optical alignment with said radiation source, said cell, and said detecting means; a housing enclosing said second block and spaced therefrom; a mass of heat insulating material disposed between said housing and the assembly formed by said second block and said circular plates; and means extending from the second end of said first conduit to a region exterior of said housing to supply a test fluid to be analyzed.

6. A refractometer adapted to be operated at elevated temperatures comprising a source of radiation; radiation detecting means; a refractometer cell disposed between said source and said detecting means, said cell comprising a first cylindrical metal block having a cylindrical light passage therethrough, radiation transparent means positioned across the ends of said passage, a radiation transparent plate disposed in said passage to divide same into first and second chambers, the planes of the faces of said plate making an angle other than 90° with the axis of said passage, and inlet and outlet passages in said first chamber; a second cylindrical metal block surrounding said first block; a first conduit enclosing said second block and in contact therewith; means connecting one end of said conduit to said inlet passage; circular plates disposed across the ends of said second block, said circular plates having openings therein in optical alignment with said radiation source, said cell, and said detecting means; first housing enclosing said second block and spaced therefrom; a mass of heat insulating material disposed between said housing and the assembly formed by said second block and said circular plates; a second housing surrounding said first housing, said second housing having an opening therein; a plug disposed in the opening in said second housing; first conduit means extending through said plug to engage the second end of said first conduit; second conduit means extending through said plug to engage said outlet passage; and means to heat said plug and at least portions of said first and second conduit means external of said second housing.

7. The refractometer of claim 6 further comprising means communicating between said first and second conduit means external of said second housing to equalize the pressures in said first and second conduit means; and means to heat said means to equalize pressures.

8. A refractometer adapted to be operated at elevated temperatures comprising a source of radiation; radiation detecting means; a refractometer cell disposed between said source and said detecting means, said cell comprising a first cylindrical metal block having a cylindrical light passage therethrough, radiation transparent means positioned across the ends of said passage, a radiation transparent plate disposed in said passage to divide same into first and second chambers, the planes of the faces of said plate making an angle other than 90° with the axis of said passage, and inlet and outlet passages in said first chamber; a second cylindrical metal block surrounding said first block; a first conduit enclosing said second block and in contact therewith; means connecting one end of said conduit to said inlet passage; circular plates disposed across the ends of said second block, said circular plates having openings therein in optical alignment with said radiation source, said cell, and said detecting means; hollow cylinders disposed between the ends of said passage and the openings in said circular plates; a housing enclosing said second block and spaced therefrom; a mass of heat insulating material disposed between said housing and the assembly formed by said second block and said circular plates; and means extending from the second end of said first conduit to a region exterior of said housing to supply a test fluid to be analyzed.

9. A refractometer adapted to be operated at elevated temperatures comprising a source of radiation; radiation detecting means; a refractometer cell disposed between said source and said detecting means, said cell comprising a first cylindrical metal block having a cylindrical light passage therethrough, radiation transparent means positioned across the ends of said passage, a radiation transparent plate disposed in said passage to divide same into first and second chambers, the planes of the faces of said plate making an angle other than 90° with the axis of said passages, and inlet and outlet passages in said first chamber; a second cylindrical metal block surrounding said first block; a first conduit enclosing said second block and in contact therewith; means connecting one end of said conduit to said inlet passage; circular plates disposed across the ends of said second block, said circular plates having openings therein in optical alignment with said radiation source, said cell, and said detecting means; hollow cylinders disposed between the ends of said passage and the openings in said circular plates, a plurality of electrical heating elements in thermal contact with said first block; first and second thermostats in thermal contact with said first block, said first thermostat closing when the temperature is less than a first value, said second thermostat opening when the temperature is greater than a second value which is greater than the first value; means connecting said heating elements, said source of electrical energy and said thermostats in circuit with one another, said thermostats being connected in series relationship with one another; a housing enclosing said second block and spaced therefrom; a mass of heat insulating material disposed between said housing and the assembly formed by said second block and said circular plates; and means extending from the second end of said first conduit to a region exterior of said housing to supply a test fluid to be analyzed.

References Cited in the file of this patent

UNITED STATES PATENTS

| 2,427,996 | Seaman | Sept. 23, 1947 |
| 2,624,014 | Barston | Dec. 30, 1952 |
| 2,686,454 | Ruska | Aug. 17, 1954 |